US010338849B2

United States Patent
Chen et al.

(10) Patent No.: US 10,338,849 B2
(45) Date of Patent: Jul. 2, 2019

(54) METHOD AND DEVICE FOR PROCESSING I/O REQUEST IN NETWORK FILE SYSTEM

(71) Applicant: Huawei Technologies Co., Ltd., Shenzhen (CN)

(72) Inventors: Lin Chen, Shenzhen (CN); Xiangyang Xu, Shenzhen (CN); Liufei Wen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/667,858

(22) Filed: Aug. 3, 2017

(65) Prior Publication Data

US 2017/0329558 A1 Nov. 16, 2017

Related U.S. Application Data

(63) Continuation of application No. PCT/CN2015/072152, filed on Feb. 3, 2015.

(51) Int. Cl.
*G06F 3/06* (2006.01)
*G06F 16/182* (2019.01)
*G06F 16/00* (2019.01)

(52) U.S. Cl.
CPC ............ *G06F 3/0659* (2013.01); *G06F 3/061* (2013.01); *G06F 3/0635* (2013.01); *G06F 16/00* (2019.01);
(Continued)

(58) Field of Classification Search
CPC . G06F 3/06; G06F 3/0605; G06F 3/61; G06F 3/061; G06F 3/0659; G06F 3/0635; G06F 3/067; G06F 16/183; G06F 16/00
See application file for complete search history.

(56) References Cited

U.S. PATENT DOCUMENTS 8,443,088 B2 * 5/2013 Tanimoto .......... G06F 17/30094
709/217
8,601,473 B1 12/2013 Aron et al.
(Continued)

FOREIGN PATENT DOCUMENTS

CN 101883028 A 11/2010
CN 103561101 A 2/2014
(Continued)

OTHER PUBLICATIONS

Merino, J., NFS file handles,' XP055415788, Sep. 10, 2005, 2 pages.
(Continued)

*Primary Examiner* — Steven G Snyder
*Assistant Examiner* — Christopher Daley
(74) *Attorney, Agent, or Firm* — Conley Rose, P.C.

(57) ABSTRACT

A method and device for processing an input/output (I/O) request in a network file system (NFS) includes sending, by a NFS server, a request for parsing the unidentifiable NFS FH to a centralized controller when a NFS file handle (NFS FH) in an I/O request cannot be identified, receiving, by the NFS server, a file identifier that corresponds to the unidentifiable NFS FH from the centralized controller according to the parsing request, where the file identifier is determined according to a pre-stored correspondence between NFS FHs and file identifiers, and processing, by the NFS server, the I/O request according to the file identifier.

14 Claims, 5 Drawing Sheets

(52) U.S. Cl.
CPC .......... *G06F 16/183* (2019.01); *G06F 3/0605* (2013.01); *G06F 3/067* (2013.01)

(56) References Cited

U.S. PATENT DOCUMENTS

| | | | |
|---|---|---|---|
| 8,615,502 B2 | 12/2013 | Saraf et al. | |
| 8,706,833 B1 | 4/2014 | Bergant et al. | |
| 8,943,110 B2* | 1/2015 | Barnes .............. | G06F 17/30091 |
| | | | 707/822 |
| 8,990,270 B2 | 3/2015 | Uysal et al. | |
| 9,165,006 B2* | 10/2015 | Barnes .............. | G06F 17/30126 |
| 9,715,521 B2* | 7/2017 | Barrus ................ | G06F 11/1076 |
| 9,985,829 B2* | 5/2018 | Tarlano .............. | H04L 41/0806 |
| 2003/0140051 A1 | 7/2003 | Fujiwara et al. | |
| 2007/0288535 A1 | 12/2007 | Shitomi et al. | |
| 2008/0010485 A1 | 1/2008 | Shitomi et al. | |
| 2008/0027998 A1 | 1/2008 | Hara | |
| 2008/0126434 A1* | 5/2008 | Uysal ................ | G06F 17/30233 |
| 2010/0198972 A1* | 8/2010 | Umbehocker ........ | G06F 3/0604 |
| | | | 709/226 |
| 2011/0202765 A1* | 8/2011 | McGrane ................ | G06F 21/53 |
| | | | 713/168 |
| 2012/0278571 A1* | 11/2012 | Fleming .................. | G06F 9/455 |
| | | | 711/162 |
| 2013/0007518 A1 | 1/2013 | George et al. | |
| 2013/0055240 A1* | 2/2013 | Gondi ................ | G06F 11/1484 |
| | | | 718/1 |
| 2013/0246393 A1* | 9/2013 | Saraf ................ | G06F 17/30238 |
| | | | 707/718 |
| 2013/0275640 A1* | 10/2013 | Wang ...................... | G06F 13/36 |
| | | | 710/300 |
| 2014/0181398 A1 | 6/2014 | Bhat et al. | |
| 2014/0359612 A1 | 12/2014 | D'Amato et al. | |
| 2015/0040127 A1* | 2/2015 | Dippenaar ............ | G06F 9/4856 |
| | | | 718/1 |
| 2015/0295765 A1* | 10/2015 | Dickey ............... | H04L 41/0856 |
| | | | 709/220 |
| 2016/0378537 A1* | 12/2016 | Zou ....................... | G06F 9/4856 |
| | | | 718/1 |

FOREIGN PATENT DOCUMENTS

| | | |
|---|---|---|
| CN | 103636165 A | 3/2014 |
| CN | 103765372 A | 4/2014 |
| JP | 2003216474 A | 7/2003 |
| JP | 2007334878 A | 12/2007 |

OTHER PUBLICATIONS

Shepler, S., et al., "Network File System (NFS) version 4 Protocol," RFC 3530, Apr. 2003, 276 pages.
Foreign Communication From a Counterpart Application, European Application No. 15880700.8, Extended European Search Report dated Oct. 25, 2017, Oct. 25, 2017, 8 pages.
Foreign Communication From a Counterpart Application, Japanese Application No. 2017-558602, Japanese Notice of Allowance dated Jul. 10, 2018, 3 pages.
Li, Z., et al., "Research on Dynamic Migration of Virtual Machine Based on Device-Agent Mechanism," Application Research of Computers, vol. 26, No. 4., Apr. 30, 2009, 4 pages.
English Translation of Li, Z., et al., "Research on Dynamic Migration of Virtual Machine Based on Device-Agent Mechanism," Application Research of Computers, vol. 26, No. 4., Apr. 30, 2009, 1 page.
Xue, J., et al., "Study on Virtual Machine's Live Migration," Journal of Computer Applications, vol. 28, No. 9, Sep. 30, 2008, pp. 2375-2385.
English Translation of Xue, J., et al., "Study on Virtual Machine's Live Migration," Journal of Computer Applications, vol. 28, No. 9, Sep. 30, 2008, 1 page.
Foreign Communication From a Counterpart Application, PCT Application No. PCT/CN2015/072152, English Translation of International Search Report dated Jul. 29, 2015, 2 pages.
Foreign Communication From a Counterpart Application, PCT Application No. PCT/CN2015/072152, English Translation of Written Opinion dated Jul. 29, 2015, 5 pages.
Machine Translation and Abstract of Chinese Publication No. CN101883028, Nov. 10, 2010, 18 pages.
Machine Translation and Abstract of Chinese Publication No. CN103561101, Feb. 5, 2014, 8 pages.
Foreign Communication From a Counterpart Application, Chinese Application No. 201580001166.8, Chinese Search Report dated Nov. 29, 2018, 3 pages.
Foreign Communication From a Counterpart Application, Chinese Application No. 201580001166.8, Chinese Office Action dated Nov. 19, 2018, 3 pages.

* cited by examiner

METHOD AND DEVICE FOR PROCESSING I/O REQUEST IN NETWORK FILE SYSTEM

CROSS-REFERENCE TO RELATED APPLICATIONS

This application is a continuation of International Patent Application No. PCT/CN2015/072152, filed on Feb. 3, 2015, the disclosure of which is hereby incorporated by reference in its entirety.

TECHNICAL FIELD

Embodiments of the present disclosure relate to the field of computers, and to a method and device for processing an input/output (I/O) request in a network file system (NFS).

BACKGROUND

In the age of cloud computing and big data, requirements on storage performance are increasingly high. Therefore, development and application of software-defined storage (SDS) become an inevitable trend. A core of an SDS technology is to put storage-related control operations into external software relative to physical storage hardware. As a part of an operating system (OS) or a management program (for example, hypervisor), the software runs on a NFS server. The SDS technology abstracts software from hardware storage to form a shared pool that is not limited by a physical system, such that storage access can be more flexibly controlled.

An SDS technology used by a virtualization platform includes a block-level fiber channel (FC) technology, and Internet Small Computer Systems Interface (iSCSI) storage, or file-level NFS storage. A user may select an appropriate storage protocol according to different production environments and test environments, and performance and reliability requirements and other requirements.

In an NFS storage system, a client needs to identify a file using a hierarchical structure of a NFS server, so as to perform a subsequent operation. Generally, the NFS server allocates a unique file handle to each file, and uses the file handle as an identifier. However, the file handle is not global, and each NFS server maintains its own NFS file handle (NFS FH), mount list, and mapping relationship between the NFS FH and a file system handle (FSH) at a back end.

When a virtual machine migrates, a service on the virtual machine is not disabled. Therefore, when performing data communication with a new NFS server, the virtual machine still uses an old context. As a result, the new NFS server cannot identify the context, thereby causing a service interruption. Alternatively, if the virtual machine first disconnects a connection established between the virtual machine and a previous NFS server previously, then migrates, and then establishes a connection to the new NFS server, the process is relatively time-consuming, does not meet a requirement for service perception-free during virtual machine migration, and may also cause a service interruption.

SUMMARY

Embodiments of the present disclosure provide a method and device for processing an I/O request in a NFS, so as to implement perception-free virtual machine migration.

According to a first aspect, an embodiment of the present disclosure provides a method for processing an I/O request in a NFS, including, when a NFS FH in an I/O request cannot be identified, sending, by a NFS server, a parsing request for the unidentifiable NFS FH to a centralized controller, receiving, by the NFS server, a file identifier that corresponds to the unidentifiable NFS FH and that is sent by the centralized controller according to the parsing request, where the file identifier is determined by the centralized controller according to a pre-stored correspondence between NFS FHs and file identifiers, and processing, by the NFS server, the I/O request according to the file identifier.

With reference to the first aspect, in a first implementation manner of the first aspect, the processing, by the NFS server, the I/O request according to the file identifier includes determining, by the NFS server, a newly allocated NFS FH, corresponding to the file identifier, in the NFS server, determining, by the NFS server according to the newly allocated NFS FH, a FSH that is used during processing of the I/O request, and processing, by the NFS server, the I/O request according to the FSH.

With reference to the first aspect and the foregoing implementation manner, in a second implementation manner of the first aspect, after the determining, by the NFS server according to the newly allocated NFS FH, a FSH that is used during processing of the I/O request, the method further includes storing, by the NFS server, a correspondence among the file identifier, the unidentifiable NFS FH, the newly allocated NFS FH and the FSH locally or at a back end.

With reference to the first aspect and the foregoing implementation manners, in a third implementation manner of the first aspect, after the determining, by the NFS server according to the newly allocated NFS FH, a FSH that is used during processing of the I/O request, the method further includes sending, by the NFS server, the correspondence among the file identifier, the unidentifiable NFS FH, the newly allocated NFS FH and the FSH to the centralized controller.

With reference to the first aspect and the foregoing implementation manners, in a fourth implementation manner of the first aspect, before the sending, by a NFS server, a parsing request for the unidentifiable NFS FH to a centralized controller, the method further includes receiving, by the NFS server, the I/O request sent by a virtual machine, and when the NFS FH in the I/O request does not exist in a local cache, determining, by the NFS server, that the NFS FH in the I/O request cannot be identified.

According to a second aspect, an embodiment of the present disclosure provides a method for processing an I/O request in a NFS, including receiving, by a centralized controller, a parsing request for an unidentifiable NFS FH, where the parsing request is sent by a NFS server, searching, by the centralized controller according to the parsing request, a pre-stored correspondence between NFS FHs and file identifiers for a file identifier corresponding to the unidentifiable NFS FH, and sending, by the centralized controller, the file identifier to the NFS server, such that the NFS server processes the I/O request according to the file identifier.

With reference to the second aspect, in a first implementation manner of the second aspect, after the sending, by the centralized controller, the file identifier to the NFS server, the method further includes receiving and storing, by the centralized controller, a correspondence among the file identifier, the unidentifiable NFS FH, a newly allocated NFS FH and an FSH, that are sent by the NFS server, where the newly allocated NFS FH and the FSH are determined by the NFS server according to the file identifier.

According to a third aspect, an embodiment of the present disclosure provides a NFS server, including a sending unit, configured to, when a NFS FH in an I/O request cannot be identified, send a parsing request for the unidentifiable NFS FH to a centralized controller, a receiving unit, configured to receive a file identifier that corresponds to the unidentifiable NFS FH and that is sent by the centralized controller according to the parsing request, where the file identifier is determined by the centralized controller according to a pre-stored correspondence between NFS FHs and file identifiers, and a processing unit, configured to process the I/O request according to the file identifier.

With reference to the third aspect, in a first implementation manner of the third aspect, the processing unit is configured to, determine a newly allocated NFS FH, of the file identifier, in the NFS server, determine, according to the newly allocated NFS FH, a FSH that is used during processing of the I/O request, and process the I/O request according to the FSH.

With reference to the third aspect and the foregoing implementation manner, in a second implementation manner of the third aspect, the processing unit is further configured to store a correspondence among the file identifier, the unidentifiable NFS FH, the newly allocated NFS FH and the FSH locally or at a back end.

With reference to the third aspect and the foregoing implementation manners, in a third implementation manner of the third aspect, the sending unit is further configured to send the file identifier, the unidentifiable NFS FH, and the correspondence between the newly allocated NFS FH and the FSH to the centralized controller.

With reference to the third aspect and the foregoing implementation manners, in a fourth implementation manner of the third aspect, the receiving unit is further configured to receive the I/O request sent by a virtual machine, and the processing unit is further configured to, when the NFS FH in the I/O request does not exist in a local cache, determine that the NFS FH in the I/O request cannot be identified.

According to a fourth aspect, an embodiment of the present disclosure provides a centralized controller, including a receiving unit, configured to receive a parsing request for an unidentifiable NFS FH, where the parsing request is sent by a NFS server, a processing unit, configured to search, according to the parsing request, a pre-stored correspondence between NFS FHs and file identifiers for a file identifier corresponding to the unidentifiable NFS FH, and a sending unit, configured to send the file identifier to the NFS server, such that the NFS server processes the I/O request according to the file identifier.

With reference to the fourth aspect, in a first implementation manner of the fourth aspect, the receiving unit is further configured to receive and store a correspondence among the file identifier, the unidentifiable NFS FH, a newly allocated NFS FH and an FSH, that are sent by the NFS server, where the newly allocated NFS FH and the FSH are determined by the NFS server according to the file identifier.

According to a fifth aspect, an embodiment of the present disclosure provides a computer device, including a processor, a memory, and a bus, where the memory is configured to store instructions executed by the computer, the processor is connected to the memory using the bus, and when the computer device operates, the processor reads the instruction stored in the memory to perform the method according to any one of the foregoing aspects or implementation manners.

According to a sixth aspect, an embodiment of the present disclosure provides a NFS, including the NFS server according to any one of the foregoing aspects or implementation manners, and the centralized controller according to any one of the foregoing aspects or implementation manners.

Based on the foregoing technical solution, in the embodiments of the present disclosure, mapping relationships between NFS FHs and file identifiers in different NFS servers are stored in a centralized controller. In this way, when migration occurs, a virtual machine may still use an old NFS FH to initiate an I/O request. A NFS server after the migration may initiate a request for parsing the old NFS FH to the centralized controller, and process the I/O request according to an obtained file identifier. In this way, a service of the virtual machine is not interrupted, and a process in which an NFS connection is disconnected first and then a new NFS connection is established is not required, such that perception-free virtual machine migration is implemented.

BRIEF DESCRIPTION OF DRAWINGS

To describe the technical solutions in the embodiments of the present disclosure more clearly, the following briefly describes the accompanying drawings required for describing the embodiments of the present disclosure. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly and describes the technical solutions in the embodiments of the present disclosure with reference to the accompanying drawings in the embodiments of the present disclosure. The described embodiments are some rather than all of the embodiments of the present disclosure. All other embodiments obtained by a person of ordinary skill in the art based on the embodiments of the present disclosure without creative efforts shall fall within the protection scope of the present disclosure.

Figure 1:
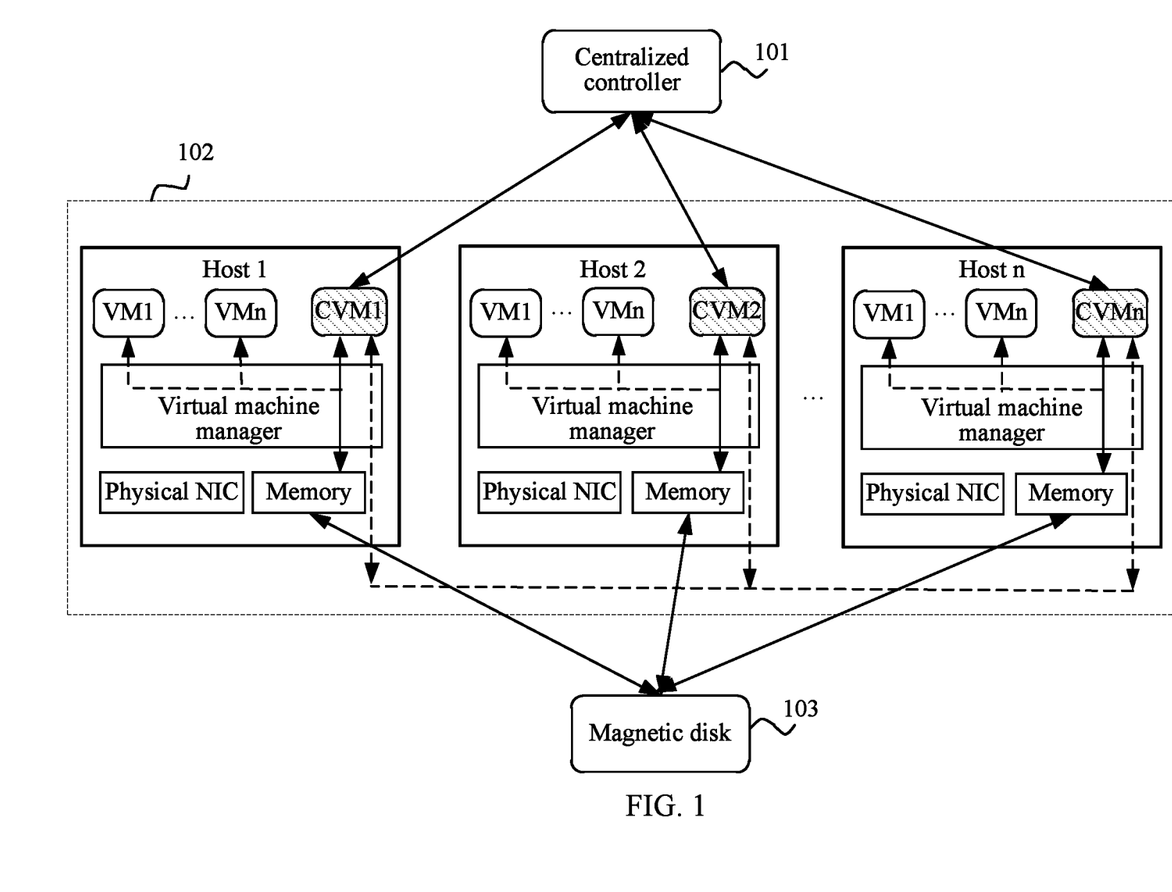
FIG. 1 is an architectural diagram of a data center of a NFS according to an embodiment of the present disclosure.

FIG. 1 is an architectural diagram of a data center of a NFS according to an embodiment of the present disclosure. As shown in FIG. 1, the NFS includes a centralized controller 101, a host 102 (a host 1, a host 2, . . . , and a host n), and a magnetic disk 103. It should be understood that a quantity of hosts is not limited in this embodiment of the present disclosure. In this embodiment of the present disclosure, the centralized controller 101 is separately connected to a controller virtual machine (CVM) in each host, so as to perform cooperative management on data communication of each host (the host 1, the host 2, . . . , and the host n).

The following describes the NFS in this embodiment of the present disclosure using the host 1 as an example. Many virtual machines (a VM 1, a VM 2, . . . , and a VM n) run in the host 1. A NFS server runs in a CVM 1 in the host 1. Each virtual machine interacts with the NFS server using a NFS client to perform data communication. The NFS server may process data reading and writing operations according to an I/O request that is sent by a virtual machine (the VM 1, the VM 2, . . . , or the VM n) using the NFS client. A virtual machine manager (for example, hypervisor) is configured to implement a function of monitoring the virtual machine. A physical network interface card (NIC) is configured to provide a network connection. A memory and the external magnetic disk 103 are configured to provide storage mediums.

Each virtual machine is stored in the NFS server in a form of an image file, or is backed up and stored in an external magnetic disk. For example, the virtual machine is stored in a hard disk drive (HDD)/solid state drive (SSD)/storage area network (SAN)/network-attached storage (NAS), and is backed up in a storage system at a back end. In an NFS, an operation on a virtual machine is converted to accessing, using a NFS client, an image file that is stored locally or on a remote magnetic disk. The NFS client may be disposed in a virtual machine manager, or may be disposed in a virtual machine. This is not limited in this embodiment of the present disclosure.

The NFS server allocates a unique NFS FH to each file, and uses the NFS FH as a file identifier of the file. From a perspective of a client, the NFS FH is a 64-byte character string (lengths are different for different NFS versions). From a perspective of a NFS server, a file handle is a set of any bytes for uniquely identifying a file.

A file handle is used to perform data reading and writing operations on a file, such that path names of a client and a NFS server can be syntactically separated, and clients with different structures are allowed to access a file having a hierarchical structure. In this way, when a client initiates an I/O request to perform an operation on a file, instead of indicating the file using a full path name, a pre-obtained file handle for referencing the file is used.

In this embodiment of the present disclosure, file reading and writing operations between the client and the NFS server are performed using a NFS FH. The client establishes a connection (this means, an NFS connection) to the NFS server using an NFS protocol, and performs data reading and writing operations by means of virtualized storage. Each NFS server maintains a mapping relationship between an NFS FH of the NFS server and a FSH of a host. That is, the NFS FH is not global. When an I/O request is received, the NFS server determines an FSH according to an NFS FH in the I/O request, and then performs reading and writing operations on a stored file according to the FSH.

In the NFS provided in this embodiment of the present disclosure, when migration occurs, the virtual machine may still use an old NFS FH to complete data reading and writing operations. For example, the centralized controller may store a table of mapping relationships between NFS FHs allocated by NFS servers of each host and file identifiers. When the virtual machine migrates from the host 1 to the host 2, the virtual machine may still use the NFS FH that is allocated to the virtual machine by the host 1 (the NFS server running in the CVM 1) to initiate an I/O request to a NFS server in the host 2. The host 2 (an NFS server running in a CVM 2) may initiate a parsing request for the I/O request to the centralized controller, so as to complete data reading and writing operations.

The technical solution provided in this embodiment of the present disclosure can implement perception-free virtual machine migration. Without needing to disconnect an NFS connection to a host 1 (an NFS server running in a CVM 1) first and then establish a connection to a host 2 (an NFS server running in a CVM 2), a virtual machine can initiate an I/O request to the host 2 using an old NFS FH that is allocated by the host 1 to the virtual machine. In this way, a service of the virtual machine is not interrupted, and a process in which an NFS connection is disconnected first and then a new NFS connection is established is not required, such that perception-free virtual machine migration is implemented.

The following describes the embodiments of the present disclosure in more detail with reference to embodiments.

Figure 2:
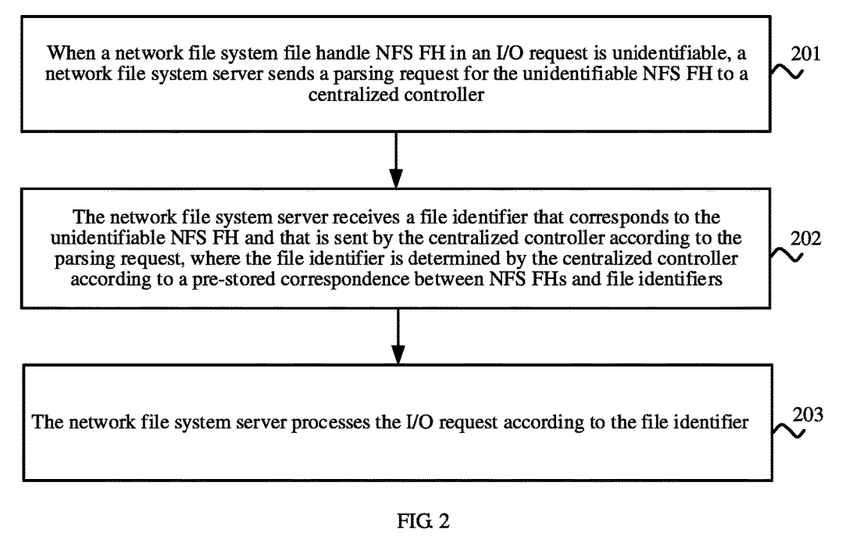
FIG. 2 is a schematic flowchart of a method for processing an I/O request in a NFS according to an embodiment of the present disclosure.

FIG. 2 is a schematic flowchart of a method for processing an I/O request in a NFS according to an embodiment of the present disclosure. The method shown in FIG. 2 is performed by a NFS server, such as a NFS server running in a CVM 1, a CVM 2, or a CVM n shown in FIG. 1.

201: When a NFS FH in an I/O request cannot be identified, the NFS server sends a parsing request for the unidentifiable NFS FH to a centralized controller.

For example, when a host is faulty, a virtual machine migrates, and during the migration, a service is not disabled. When the virtual machine migrates to a new host, the virtual machine initiates an I/O request still using an NFS FH that is allocated to the virtual machine by a NFS server of a previous host. When a new NFS server cannot identify the NFS FH, the new NFS server may send a parsing request for the unidentifiable NFS FH to the centralized controller.

202: The NFS server receives a file identifier corresponding to the unidentifiable NFS FH that is sent by the centralized controller according to the parsing request, where the file identifier is determined by the centralized controller according to a pre-stored correspondence between NFS FHs and file identifiers.

For example, the centralized controller stores the file identifier, such as an identifier of an image file that corresponds to the NFS FH. In this way, the centralized controller may send the file identifier corresponding to the NFS FH to the NFS server, such that the NFS server processes the I/O request according to the file identifier.

203: The NFS server processes the I/O request according to the file identifier.

For example, after obtaining the file identifier, the NFS server may perform reading and writing operations on a corresponding file that is stored locally or at a back end. If an image file of the virtual machine is as a whole, the NFS server may complete data reading and writing operations according to the file identifier and an offset. If the image file of the virtual machine is not as a whole, the NFS server may complete reading and writing operations according to only the file identifier.

Based on the foregoing technical solution, in this embodiment of the present disclosure, mapping relationships between NFS FHs and file identifiers in different NFS servers are stored in a centralized controller. In this way, when migration occurs, a virtual machine may still use an old NFS FH to initiate an I/O request. A NFS server after the migration may initiate a parsing request for the old NFS FH to the centralized controller, and process the I/O request according to an obtained file identifier. In this way, a service of the virtual machine is not interrupted, and a process in which an NFS connection is disconnected first and then a new NFS connection is established is not required, such that perception-free virtual machine migration is implemented.

Optionally, in an embodiment, when processing the I/O request according to the file identifier, the NFS server may determine a newly allocated NFS FH, of the file identifier, in the NFS server first, then the NFS server determines, according to the newly allocated NFS FH, a FSH that is used during processing of the I/O request, and finally, the NFS server processes the I/O request according to the FSH.

Optionally, in another embodiment, after determining, according to the newly allocated NFS FH, the FSH that is used during processing of the I/O request, the NFS server stores a correspondence among the file identifier, the unidentifiable NFS FH, the newly allocated NFS FH and the FSH locally or at a back end.

In this way, the centralized controller may obtain and store the correspondence among the file identifier, the unidentifiable NFS FH, the newly allocated NFS FH and the FSH, such that when the virtual machine migrates again, the NFS server initiates a parsing request.

Optionally, in another embodiment, before the NFS server sends the parsing request for the unidentifiable NFS FH to the centralized controller, the NFS server receives the I/O request sent by a virtual machine. When the NFS FH in the I/O request does not exist in a local cache, the NFS server determines that the NFS FH in the I/O request cannot be identified.

For example, after receiving the I/O request sent by the virtual machine, the NFS server uses the NFS FH in the I/O request to match a locally stored mapping table. If the NFS FH is not matched in a cache, that is, a mapping table corresponding to the NFS FH is not stored in the cache, the NFS server may determine that the NFS FH in the I/O request cannot be identified. In this way, the NFS server needs to initiate the parsing request for the NFS FH to the centralized controller.

Figure 3:
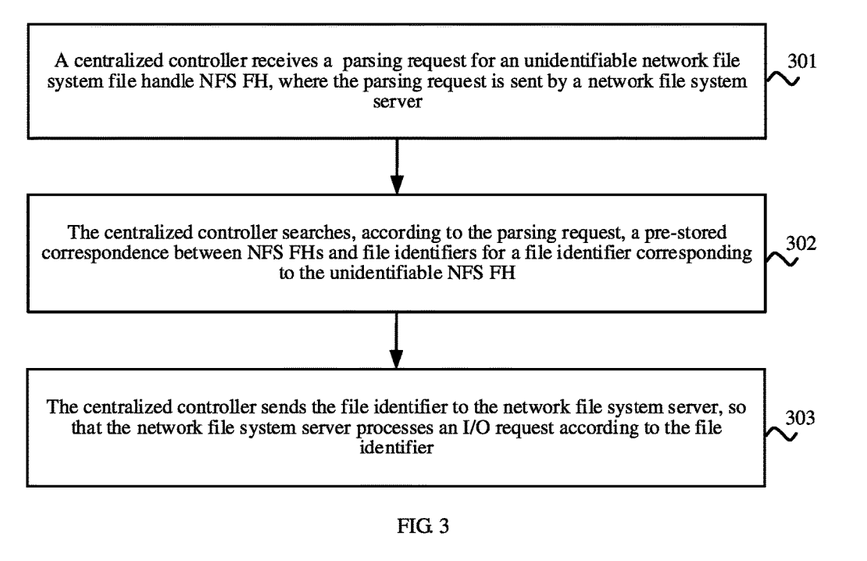
FIG. 3 is a schematic flowchart of a method for processing an I/O request in a NFS according to another embodiment of the present disclosure.

FIG. 3 is a schematic flowchart of a method for processing an I/O request in a NFS according to another embodiment of the present disclosure. The method shown in FIG. 3 is performed by a centralized controller, such as the centralized controller 101 shown in FIG. 1. The centralized controller may be a SDS controller or another form that can be implemented. This is not limited in this embodiment of the present disclosure.

301: The centralized controller receives a parsing request for an unidentifiable NFS FH, wherein the parsing request is sent by a NFS server.

For example, when a host is faulty, a virtual machine migrates, and during the migration, a service is not disabled. When the virtual machine migrates to a new host, the virtual machine initiates an I/O request still using an NFS FH that is allocated to the virtual machine by a NFS server of a previous host. When a new NFS server cannot identify the NFS FH, the new NFS server may send a parsing request for the NFS FH to the centralized controller.

302: The centralized controller searches, according to the parsing request, a pre-stored correspondence between NFS FHs and file identifiers for a file identifier corresponding to the unidentifiable NFS FH.

303: The centralized controller sends the file identifier to the NFS server, such that the NFS server processes the I/O request according to the file identifier.

For example, the centralized controller stores the file identifier, such as an identifier of an image file that corresponds to the NFS FH. In this way, the centralized controller may send the file identifier corresponding to the NFS FH to the NFS server, such that the NFS server processes the I/O request according to the file identifier.

Based on the foregoing technical solution, in this embodiment of the present disclosure, mapping relationships between NFS FHs and file identifiers in different NFS servers are stored in a centralized controller. In this way, when migration occurs, a virtual machine may still use an old NFS FH to initiate an I/O request. A NFS server, in a host, after the migration may initiate a parsing request for the old NFS FH to the centralized controller, and process the I/O request according to an obtained file identifier. In this way, a service of the virtual machine is not interrupted, and a process in which an NFS connection is disconnected first and then a new NFS connection is established is not required, such that perception-free virtual machine migration is implemented.

Optionally, in an embodiment, after sending, according to the parsing request, the file identifier corresponding to the NFS FH to the NFS server, the centralized controller receives and stores a correspondence among a newly allocated NFS FH and an FSH, the file identifier, and the unidentifiable NFS FH that are sent by the NFS server, where the newly allocated NFS FH and the FSH are determined by the NFS server according to the file identifier.

In this way, the centralized controller may obtain and store and the correspondence among the file identifier, the unidentifiable NFS FH, the newly allocated NFS FH and the FSH, such that when the virtual machine migrates again, the NFS server initiates a parsing request.

Figure 4:
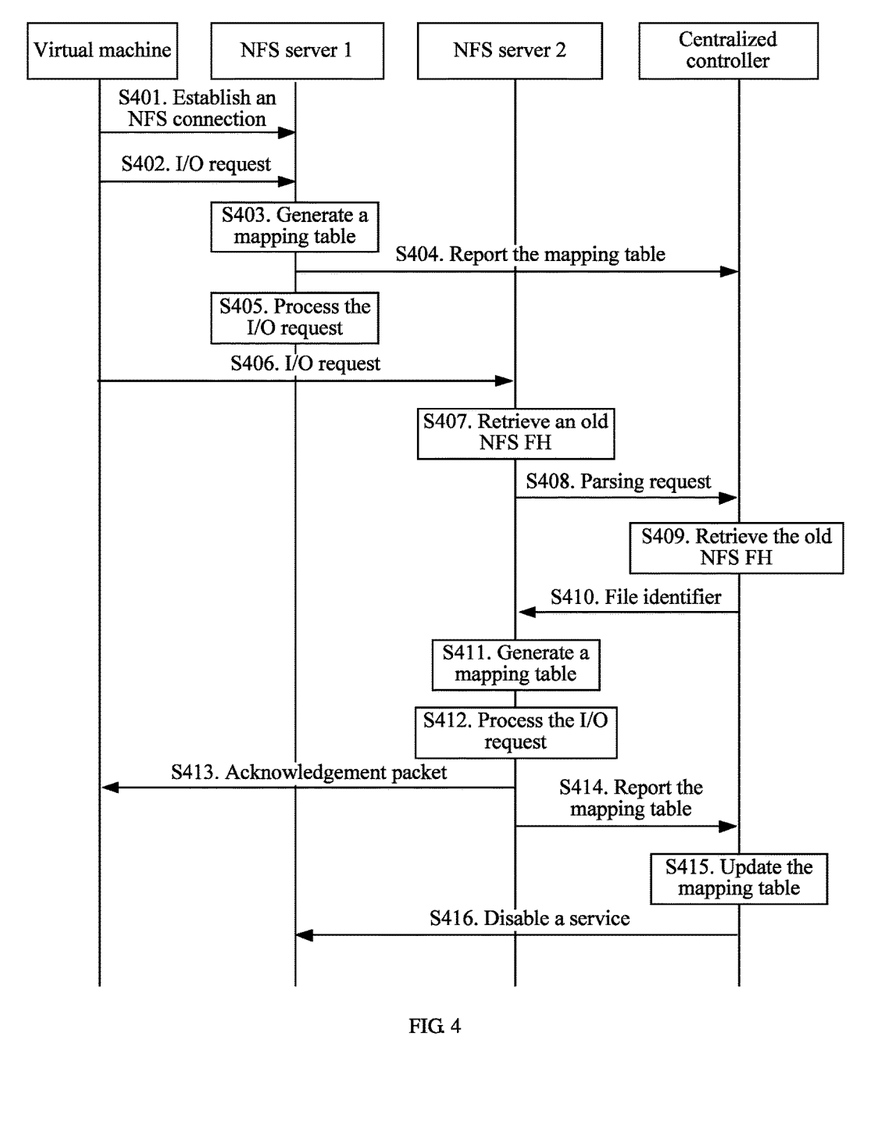
FIG. 4 is a schematic flowchart of a method for processing an I/O request in a NFS according to another embodiment of the present disclosure.

The following describes the embodiments of the present disclosure in detail with reference to examples. It should be noted that these examples are merely intended to help a person skilled in the art to better understand the embodiments of the present disclosure, and are not intended to limit the scope of the embodiments of the present disclosure. FIG. 4 is a schematic flowchart of a method for processing an I/O request in a NFS according to another embodiment of the present disclosure.

S401: A virtual machine establishes an NFS connection to a NFS server 1 (an NFS server running in a CVM 1) in a host 1 using a client. Optionally, a NFS server may allocate a unique NFS FH to each file in advance.

S402: The virtual machine initiates an I/O request to the NFS server 1 using the client, where the I/O request carries an NFS FH corresponding to a to-be-processed file.

S403: The NFS server 1 generates a local mapping table 1 and a global mapping table 1 according to the NFS FH in the I/O request. Optionally, the NFS server 1 stores the local mapping table 1 locally, so as to facilitate processing of the I/O request next time.

Local mapping table 1

| File identifier (image file name) | Shared directory | Permission | NFS FH | FSH |
|---|---|---|---|---|
| Ubuntu-server.img | /home/mnt | RW | 4e0008000000001000000d141000082d008000000000000000000000000000000000a00000000000000f45f150844d8110810cfc3bf18000000283cfcb31100 | 00000000000041d1 |

Global mapping table 1

| File identifier (image file name) | File Address | Controlled by | Size | Permission | Old NFS FH | New NFS FH | FSH |
|---|---|---|---|---|---|---|---|
| Ubuntu-server.img | /home/mnt/ubuntu-server.img | Host1.cvm1 | 10 G | RW | 4e000800000001000000d141000082d00800000000000000000000000000000000a00000000000000f45f150844d8110810cfc3bf18000000283cfcb31100 | N/A | 00000000000041d1 |

S404: The NFS server 1 reports the global mapping table 1 to a centralized controller. In this way, when the virtual machine migrates, the centralized controller can process a parsing request for the NFS FH, where the parsing request is initiated by an NFS server on a new host.

S405: The NFS server 1 processes the I/O request according to the local mapping table.

For example, the NFS server 1 performs, according to the FSH in the local mapping table, reading and writing operations on a corresponding file that is stored locally or at a back end.

S406: When the virtual machine migrates to a host 2, the virtual machine does not disconnect the NFS connection to the NFS server 1, and does not disable a service, but directly initiates an I/O request to an NFS server 2 using an old NFS FH that is allocated to the virtual machine by the NFS server 1.

S407: The NFS server 2 locally retrieves, according to the I/O request, a mapping table (the local mapping table and the global mapping table) that matches the old NFS FH.

S408: When the mapping table that matches the old NFS FH is not found, the NFS server 2 sends a parsing request to the centralized controller.

S409: The centralized controller retrieves, according to the parsing request, the global mapping table 1 that matches the old NFS FH.

S410: The centralized controller delivers the global mapping table 1 or a file identifier corresponding to the old NFS FH in the global mapping table 1 to the NFS server 2.

S411: The NFS server 2 generates a local mapping table 2 and a global mapping table 2 according to the file identifier. Optionally, the NFS server 2 stores the local mapping table 2 locally, so as to facilitate processing of the I/O request next time.

Local mapping table 2

| File identifier (image file name) | Shared directory | Permission | NFS FH | FSH |
|---|---|---|---|---|
| Ubuntu-server.img | /home/usr | RW | 4e00080000000100000071570004d08400f00000000000000000000000000000000000000000000000000000000000000000000000000000000000000000000 | 0000000000005771 |

Global mapping table 2

| File identifier (image file name) | File Address | Controlled by | Size | Permission | Old NFS FH | New NFS FH | FSH |
|---|---|---|---|---|---|---|---|
| Ubuntu-server.img | /home/usr/ubuntu-server.img | Host2.cvm2 | 10 G | RW | 4e0008000000001000000d141000082d00800000000000000000000000000000000a00000000000000f45f150844d8110810cfc3bf18000000283cfcb31100 | 4e000800000010000007157000004d08400f000000000000000000000000000000000000000000000000000000000000000000000000000000000000000000000 | 0000000000005771 |

S412: The NFS server 2 processes the I/O request according to an FSH in the local mapping table 2.

S413: The NFS server 2 sends a corresponding fill acknowledgement packet to the virtual machine.

S414: The NFS server 2 reports the global mapping table 2 to the centralized controller, such that when the virtual machine migrates, the NFS server after the migration may initiate a parsing request for the NFS FH.

S415: The centralized controller stores and updates the global mapping table.

S416: The centralized controller sends a closing notification to the NFS server 1, to instruct the NFS server 1 to stop a related file operation, disconnect the NFS connection, delete mounting information of the virtual machine, and the like.

Figure 5:
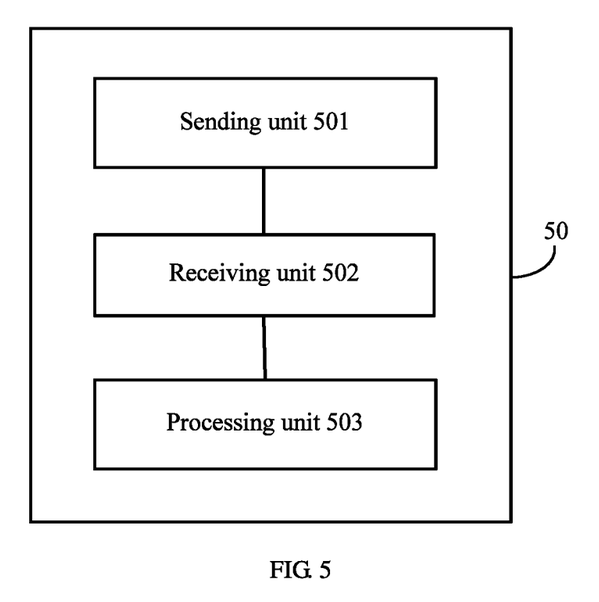
FIG. 5 is a schematic block diagram of a NFS server according to an embodiment of the present disclosure.

FIG. 5 is a schematic block diagram of a NFS server according to an embodiment of the present disclosure. As shown in FIG. 5, the NFS server 50 includes a sending unit 501, a receiving unit 502, and a processing unit 503.

The sending unit 501 is configured to, when a NFS FH in an I/O request cannot be identified, send a parsing request for the unidentifiable NFS FH to a centralized controller.

For example, when a host is faulty, a virtual machine migrates, and during the migration, a service is not disabled. When the virtual machine migrates to a new host, the virtual machine initiates an I/O request still using an NFS FH that is allocated to the virtual machine by a NFS server of a previous host. When a new NFS server cannot identify the NFS FH, the new NFS server may send a parsing request for the unidentifiable NFS FH to the centralized controller.

The receiving unit 502 is configured to receive a file identifier that corresponds to the unidentifiable NFS FH and that is sent by the centralized controller according to the parsing request, where the file identifier is determined by the centralized controller according to a pre-stored correspondence between NFS FHs and file identifiers.

For example, the centralized controller stores the file identifier, such as an identifier of an image file that corresponds to the NFS FH. In this way, the centralized controller may send the file identifier corresponding to the NFS FH to the NFS server, such that the NFS server processes the I/O request according to the file identifier.

The processing unit 503 is configured to process the I/O request according to the file identifier.

For example, after obtaining the file identifier, the NFS server may perform reading and writing operations on a corresponding file that is stored locally or at a back end. If an image file of the virtual machine is as a whole, the NFS server may complete data reading and writing operations according to the file identifier and an offset. If the image file of the virtual machine is not as a whole, the NFS server may complete reading and writing operations according to only the file identifier.

Based on the foregoing technical solution, in this embodiment of the present disclosure, mapping relationships between NFS FHs and file identifiers in different NFS servers are stored in a centralized controller. In this way, when migration occurs, a virtual machine may still use an old NFS FH to initiate an I/O request. A NFS server after the migration may initiate a parsing request for the old NFS FH to the centralized controller, and process the I/O request according to an obtained file identifier. In this way, a service of the virtual machine is not interrupted, and a process in which an NFS connection is disconnected first and then a new NFS connection is established is not required, such that perception-free virtual machine migration is implemented.

Optionally, in an embodiment, the processing unit 503 is configured to, determine a newly allocated NFS FH, of the file identifier, in the NFS server, then determine, according to the newly allocated NFS FH, a FSH that is used during processing of the I/O request, and finally process the I/O request according to the FSH.

Optionally, in another embodiment, the processing unit 503 is further configured to store a correspondence among the file identifier, the unidentifiable NFS FH, the newly allocated NFS FH and the FSH locally or at a back end.

In this way, when the virtual machine initiates the I/O request again, the NFS server may complete data reading and writing operations this time without needing to initiate a parsing request again to the centralized controller, thereby improving system efficiency.

Optionally, in another embodiment, the sending unit 501 is further configured to send the correspondence among the file identifier, the unidentifiable NFS FH, the newly allocated NFS FH and the FSH to the centralized controller.

In this way, the centralized controller may obtain and store the correspondence among the file identifier, the unidentifiable NFS FH, the newly allocated NFS FH and the FSH, such that when the virtual machine migrates again, the NFS server initiates a parsing request.

Optionally, in another embodiment, the receiving unit 502 is further configured to receive the I/O request sent by a virtual machine. The processing unit 503 is further configured to, when the NFS FH in the I/O request does not exist in a local cache, determine that the NFS FH in the I/O request cannot be identified.

For example, after receiving the I/O request sent by the virtual machine, the NFS server uses the NFS FH in the I/O request to match a locally stored mapping table. If the NFS FH is not matched in a cache, that is, a mapping table corresponding to the NFS FH is not stored in the cache, the NFS server may determine that the NFS FH in the I/O request cannot be identified. In this way, the NFS server needs to initiate the parsing request for the NFS FH to the centralized controller.

Figure 6:
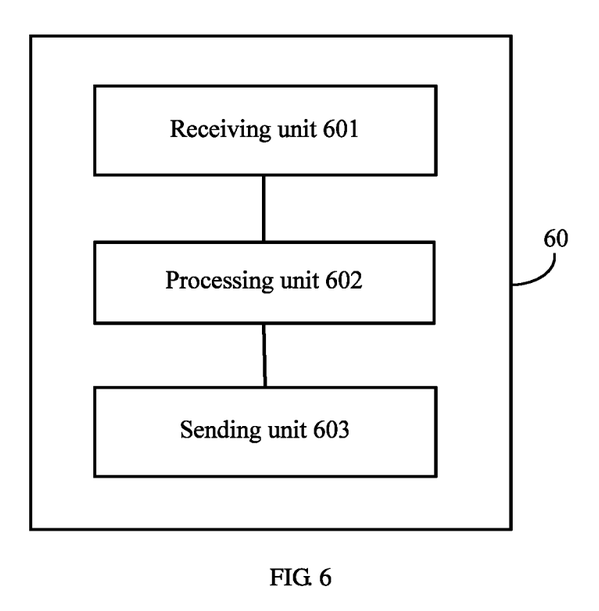
FIG. 6 is a schematic block diagram of a centralized controller according to an embodiment of the present disclosure.

FIG. 6 is a schematic block diagram of a centralized controller according to an embodiment of the present disclosure. As shown in FIG. 6, the centralized controller 60 includes a receiving unit 601, a processing unit 602, and a sending unit 603.

The receiving unit 601 is configured to receive a parsing request for an unidentifiable NFS FH, where the parsing request is sent by a NFS server.

For example, when a host is faulty, a virtual machine migrates, and during the migration, a service is not disabled. When the virtual machine migrates to a new host, the virtual machine initiates an I/O request still using an NFS FH that is allocated to the virtual machine by a NFS server of a previous host. When a new NFS server cannot identify the NFS FH, the new NFS server may send a parsing request for the NFS FH to the centralized controller.

The processing unit 602 is configured to search, according to the parsing request, a pre-stored correspondence between NFS FHs and file identifiers for a file identifier corresponding to the unidentifiable NFS FH.

The sending unit 603 is configured to send the file identifier to the NFS server, such that the NFS server processes the I/O request according to the file identifier.

For example, the centralized controller stores the file identifier, such as an identifier of an image file that corresponds to the NFS FH. In this way, the centralized controller may send the file identifier corresponding to the NFS FH to the NFS server, such that the NFS server processes the I/O request according to the file identifier.

Based on the foregoing technical solution, in this embodiment of the present disclosure, mapping relationships between NFS FHs and file identifiers in different NFS servers are stored in a centralized controller. In this way, when migration occurs, a virtual machine may still use an old NFS FH to initiate an I/O request. A NFS server, in a host, after the migration may initiate a parsing request for the old NFS FH to the centralized controller, and process the I/O request according to an obtained file identifier. In this way, a service of the virtual machine is not interrupted, and a process in which an NFS connection is disconnected first and then a new NFS connection is established is not required, such that perception-free virtual machine migration is implemented.

Optionally, in an embodiment, the receiving unit 601 is further configured to receive and store a correspondence among the file identifier, the unidentifiable NFS FH, a newly allocated NFS FH and an FSH that are sent by the NFS server, where the newly allocated NFS FH and the FSH are determined by the NFS server according to the file identifier.

In this way, the centralized controller may obtain and store the correspondence among the file identifier, the unidentifiable NFS FH, the newly allocated NFS FH and the FSH, such that when the virtual machine migrates again, the NFS server initiates a parsing request.

Figure 7:
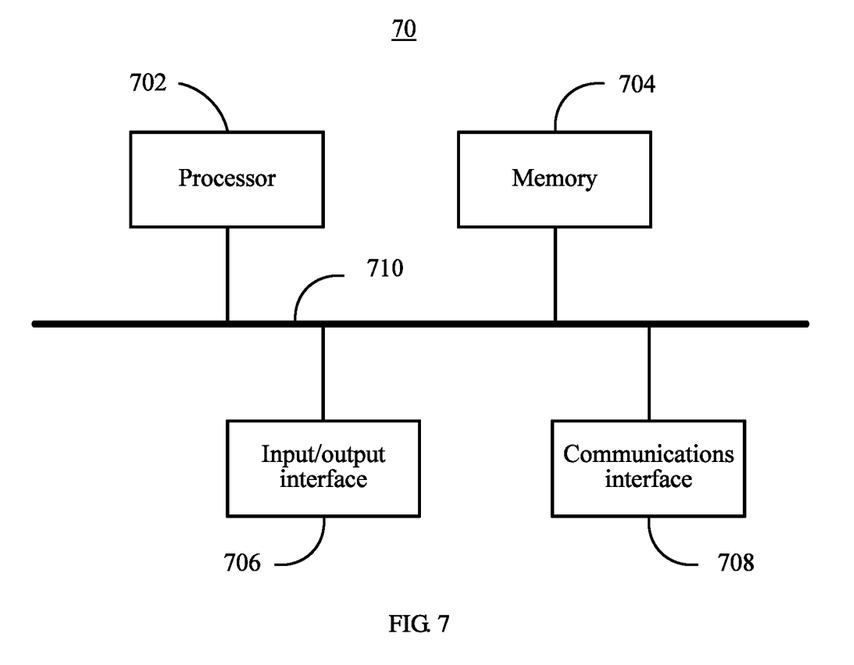
FIG. 7 is a schematic diagram of a hardware structure of a computer device according to an embodiment of the present disclosure

FIG. 7 is a schematic diagram of a hardware structure of a computer device according to an embodiment of the present disclosure. As shown in FIG. 7, the computer device 70 includes a processor 702, a memory 704, an input/output interface 706, a communications interface 708, and a bus 710. Communication connection between the processor 702, the memory 704, the input/output interface 706, and the communications interface 708 is implemented using the bus 710.

The processor 702 may be a general central processing unit (CPU), a microprocessor, an application-specific integrated circuit (ASIC), or one or more integrated circuits, and is configured to execute a related program, so as to implement a technical solution provided in this embodiment of the present disclosure.

The memory 704 may be a read-only memory (ROM), a static storage device, a dynamic storage device, or a random access memory (RAM). The memory 704 may store an OS and another application program. When the technical solution provided in this embodiment of the present disclosure is implemented using software or firmware, program code for implementing the technical solution provided in this embodiment of the present disclosure is stored in the memory 704, and is executed by the processor 702.

The input/output interface 706 is configured to receive data and information that are input, and output data such as an operation result.

The communications interface 708 uses a transmit and receive apparatus, for example, but is not limited to, a transceiver, to implement communication between the computer device 700 and another device or a communications network.

The bus 710 may include a channel, and transmit information between components (such as the processor 702, the memory 704, the input/output interface 706, and the communications interface 708) of the computer device 700.

It should be noted that although for the computer device 700 shown in FIG. 7, only the processor 702, the memory 704, the input/output interface 706, the communications interface 708, and the bus 710 are shown, in a implementation process, a person skilled in the art should understand that the computer device 700 further includes another component necessary for implementing normal running. In addition, according to a requirement, a person skilled in the art should understand that the computer device 700 may further include a hardware component for implementing another additional function. Moreover, a person skilled in the art should understand that the computer device 700 may also include only components required for implementing this embodiment of the present disclosure, and does not necessarily include all of the components shown in FIG. 7.

The hardware structure shown in FIG. 7 and the foregoing descriptions are applicable to the devices and systems for processing an I/O request in the various NFSs provided in the embodiments of the present disclosure, and are applicable to the methods for processing an I/O request in the various NFSs provided in the embodiments of the present disclosure.

In the several embodiments provided in the present application, it should be understood that the disclosed system, device, and method may be implemented in other manners. For example, the described apparatus embodiment is merely an example. For example, the module division is merely logical function division and may be other division in implementation. For example, a plurality of modules or components may be combined or integrated into another system, or some features may be ignored or not performed. In addition, the displayed or discussed mutual couplings or direct couplings or communication connections may be implemented through some interfaces. The indirect couplings or communication connections between the apparatuses or modules may be implemented in electronic, mechanical, or other forms.

The modules described as separate parts may or may not be physically separate, and parts displayed as modules may or may not be physical modules, may be located in one position, or may be distributed on a plurality of network modules. Some or all of the modules may be selected according to actual needs to achieve the objectives of the solutions of this embodiment.

In addition, functional modules in the embodiments of the present disclosure may be integrated into one processing module, or each of the modules may exist alone physically, or two or more modules are integrated into one module. The integrated module may be implemented in a form of hardware, or may be implemented in a form of hardware in addition to a software functional module.

When the foregoing integrated module is implemented in a form of a software functional module, the integrated module may be stored in a computer-readable storage medium. The software functional module is stored in a storage medium and includes several instructions for instructing a computer device (which may be a personal computer, a server, a network device, or the like) to perform some of the steps of the methods described in the embodiments of the present disclosure. The foregoing storage medium includes any medium that can store program code, such as a removable hard disk, a ROM, a RAM, a magnetic disk, or an optical disc.

The memory 704 may store instructions for performing the following process, so as to implement a function of a NFS server, when a NFS FH in an I/O request cannot be identified, sending, by the NFS server, a parsing request for the unidentifiable NFS FH to a centralized controller, receiving, by the NFS server, a file identifier that corresponds to the unidentifiable NFS FH and that is sent by the centralized controller according to the parsing request, where the file identifier is determined by the centralized controller according to a pre-stored correspondence between NFS FHs and file identifiers, and processing, by the NFS server, the I/O request according to the file identifier.

Based on the foregoing technical solution, in this embodiment of the present disclosure, mapping relationships between NFS FHs and file identifiers in different NFS servers are stored in a centralized controller. In this way, when migration occurs, a virtual machine may still use an old NFS FH to initiate an I/O request. A NFS server after the migration may initiate a parsing request for the old NFS FH to the centralized controller, and process the I/O request according to an obtained file identifier. In this way, a service of the virtual machine is not interrupted, and a process in which an NFS connection is disconnected first and then a new NFS connection is established is not required, such that perception-free virtual machine migration is implemented.

Optionally, in an embodiment, the memory 704 may further store instructions for performing the following process, when the NFS server processes the I/O request according to the file identifier, determining, by the NFS server, a newly allocated NFS FH, of the file identifier, in the NFS server, determining, by the NFS server according to the newly allocated NFS FH, a FSH that is used during processing of the I/O request, and processing, by the NFS server, the I/O request according to FSH.

Optionally, in another embodiment, the memory 704 may further store instructions for performing the following process, after the NFS server determines, according to the newly allocated NFS FH, the FSH that is used during processing of the I/O request, storing, by the NFS server, a correspondence among the file identifier, the unidentifiable NFS FH, the newly allocated NFS FH and the FSH locally or at a back end.

Optionally, in another embodiment, the memory 704 may further store instructions for performing the following process, after the NFS server determines, according to the newly allocated NFS FH, the FSH that is used during processing of the I/O request, sending, by the NFS server, the correspondence among the file identifier, the unidentifiable NFS FH, the newly allocated NFS FH and the FSH to the centralized controller.

Optionally, in another embodiment, the memory 704 may further store instructions for performing the following process, before the NFS server sends the parsing request for the unidentifiable NFS FH to the centralized controller, receiving, by the NFS server, the I/O request sent by a virtual machine, and when the NFS FH in the I/O request does not exist in a local cache, determining, by the NFS server, that the NFS FH in the I/O request cannot be identified.

The memory 704 may store instructions for performing the following process, so as to implement a function of the centralized controller, receiving, by the centralized controller, the parsing request for an unidentifiable NFS FH, where the parsing request is sent by the NFS server, searching, by the centralized controller according to the parsing request, a pre-stored correspondence between NFS FHs and file identifiers for a file identifier corresponding to the unidentifiable NFS FH, and sending, by the centralized controller, the file identifier to the NFS server, such that the NFS server processes the I/O request according to the file identifier.

Based on the foregoing technical solution, in this embodiment of the present disclosure, mapping relationships between NFS FHs and file identifiers in different NFS servers are stored in a centralized controller. In this way, when migration occurs, a virtual machine may still use an old NFS FH to initiate an I/O request. A NFS server after the migration may initiate a parsing request for the old NFS FH to the centralized controller, and process the I/O request according to an obtained file identifier. In this way, a service of the virtual machine is not interrupted, and a process in which an NFS connection is disconnected first and then a new NFS connection is established is not required, such that perception-free virtual machine migration is implemented.

Optionally, in an embodiment, the memory 704 may further store instructions for performing the following process, after the centralized controller sends the file identifier corresponding to the NFS FH to the NFS server, receiving and storing, by the centralized controller, a correspondence among a newly allocated NFS FH, an FSH, the file identifier and the unidentifiable NFS FH that are sent by the NFS server, where the newly allocated NFS FH and the FSH are determined by the NFS server according to the file identifier.

Figure 8:
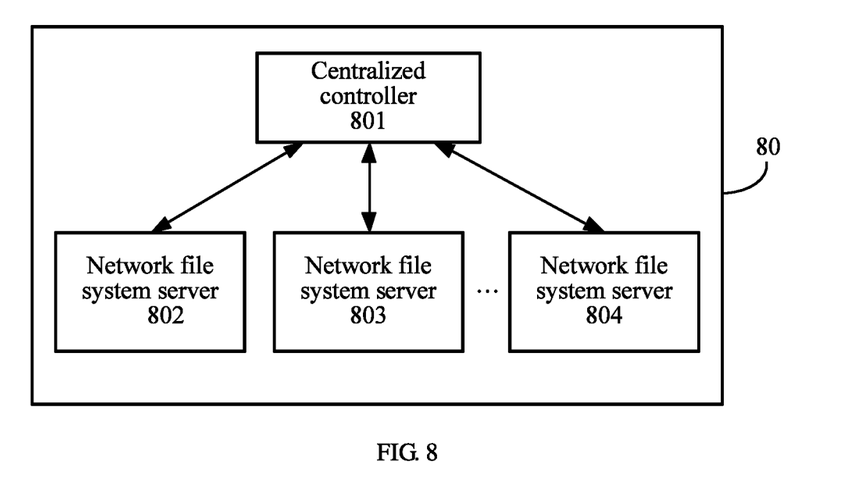
FIG. 8 is a schematic block diagram of a NFS according to an embodiment of the present disclosure.

FIG. 8 is a schematic block diagram of a NFS according to an embodiment of the present disclosure. As shown in FIG. 8, the NFS 80 includes a centralized controller 801 and NFS servers 802, 803, . . . , and 804. It should be understood that a quantity of NFS servers is not limited in this embodiment of the present disclosure. For brevity of description, a NFS server 802 is used as an example for description below.

The centralized controller 801 is separately connected to the NFS servers 802, 803, . . . , and 804. The centralized controller 801 may be a SDS controller or in another implementable form. The NFS server 802 may run in a CVM, and is configured to process data reading and writing operations according to an I/O request initiated by a virtual machine.

In this embodiment of the present disclosure, when a NFS FH in the I/O request cannot be identified, the NFS server 802 sends a parsing request for the unidentifiable NFS FH to the centralized controller 801. The centralized controller 801 receives the parsing request for the unidentifiable NFS FH, where the parsing request is sent by the NFS server, and then searches, according to the parsing request, a pre-stored correspondence between an NFS FH and a file identifier for a file identifier corresponding to the unidentifiable NFS FH.

The centralized controller 801 sends the file identifier to the NFS server 802. The NFS server 802 receives the file identifier that corresponds to the unidentifiable NFS FH and that is sent by the centralized controller 801 according to the parsing request, and then processes the I/O request according to the file identifier.

Based on the foregoing technical solution, in this embodiment of the present disclosure, mapping relationships between NFS FHs and file identifiers in different NFS servers are stored in a centralized controller. In this way, when migration occurs, a virtual machine may still use an old NFS FH to initiate an I/O request. A NFS server after the migration may initiate a parsing request for the old NFS FH to the centralized controller, and process the I/O request according to an obtained file identifier. In this way, a service of the virtual machine is not interrupted, and a process in which an NFS connection is disconnected first and then a new NFS connection is established is not required, such that perception-free virtual machine migration is implemented.

It should be understood that the centralized controller 801 and the NFS server 802 may be further configured to implement the methods for processing an I/O request in the foregoing various NFSs. To avoid repetition, details are not provided herein.

It should be understood that sequence numbers of the foregoing processes do not mean execution sequences in various embodiments of the present disclosure. The execution sequences of the processes should be determined according to functions and internal logic of the processes, and should not be construed as any limitation to the implementation processes of the embodiments of the present disclosure.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments of the present disclosure.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The software product is stored in a storage medium and includes several instructions for instructing a computer device (which may be a personal computer, a server, a network device, or the like) to perform all or some of the steps of the methods described in the embodiments of the present disclosure. The foregoing storage medium includes any medium that can store program code, such as a USB flash drive, a removable hard disk, a ROM, a RAM, a magnetic disk, or an optical disc.

The foregoing descriptions are merely embodiments of the present disclosure, but are not intended to limit the protection scope of the present disclosure. Any modification or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for processing an input/output (I/O) request in a network file system (NFS) having a first host and a second host, the method comprising:
    receiving, by a first NFS server running in the first host, the I/O request after a virtual machine migrates from the second host to the first host, the I/O request being initiated by the virtual machine using an NFS file handle (FH) allocated by a second NFS server running in the second host, wherein after the virtual machine migrates from the second host to the first host, the virtual machine initiates the I/O request while maintaining an NFS connection established with the second NFS server running in the second host and without establishing a new NFS connection with the first NFS server running in the first host;
    determining, by the first NFS server, whether the NFS FH is an unidentifiable NFS FH;
    sending, by the first NFS server, a parsing request for the unidentifiable NFS FH to a centralized controller responsive to determining that the NFS FH in the I/O request cannot be identified;
    receiving, by the first NFS server, a file identifier that corresponds to the unidentifiable NFS FH from the centralized controller in response to the parsing request, wherein the file identifier is determined according to a pre-stored correspondence between the NFS FH and the file identifier; and
    processing, by the first NFS server, the I/O request according to the file identifier.

2. The method according to claim 1, wherein the I/O request is received from the virtual machine, wherein the virtual machine runs in the second host before the virtual machine migrates from the second host to the first host, and wherein; after the virtual machine migrates from the second host to the first host, the virtual machine initiates the I/O request to the first server running in the first host without disconnecting the NFS connection established between the virtual machine and the second server running in the second host.

3. The method according to claim 1, wherein processing, by the first NFS server, the I/O request according to the file identifier comprises:
    determining, by the first NFS server, a newly allocated NFS FH corresponding to the file identifier in the first NFS server;
    determining, by the first NFS server according to the newly allocated NFS FH, a file system handle (FSH) for processing the I/O request; and
    processing, by the first NFS server, the I/O request according to the FSH.

4. The method according to claim 3, wherein after determining, by the first NFS server according to the newly allocated NFS FH, the FSH that is used during processing of the I/O request, the method further comprises storing, by the first NFS server, a correspondence among the file identifier, the unidentifiable NFS FH, the newly allocated NFS FH, and the FSH locally or at a back end.

5. The method according to claim 4, wherein after determining, by the first NFS server according to the newly allocated NFS FH, the FSH that is used during processing of the I/O request, the method further comprises sending, by the first NFS server, the correspondence among the file identifier, the unidentifiable NFS FH, the newly allocated NFS FH, and the FSH to the centralized controller.

6. The method according to claim 1, wherein before sending, by the first NFS server, the parsing request for the unidentifiable NFS FH to the centralized controller, the method further comprises:
receiving, by the first NFS server, the I/O request from the virtual machine; and
determining, by the first NFS server, that the NFS FH in the I/O request cannot be identified when the NFS FH in the I/O request does not exist in a local cache.

7. A computer device for processing an input/output (I/O) request in a network file system (NFS) having a first host and a second host, the computer device comprising:
a first NFS server running in the first host, the first NFS server including a memory configured to store instructions and a processor coupled to the memory, wherein when the computer device operates, the processor is configured to read the instructions stored in the memory to:
receive the I/O request after a virtual machine migrates from the second host to the first host, the I/O request being initiated by the virtual machine using an NFS file handle (FH) allocated by a second NFS server running in the second host, wherein after the virtual machine migrates from the second host to the first host, the virtual machine initiates the I/O request while maintaining an NFS connection established with the second NFS server running in the second host and without establishing a new NFS connection with the first NFS server running in the first host;
determine whether the NFS FH is an unidentifiable NFS FH;
send a parsing request for the unidentifiable NFS FH to a centralized controller responsive to determining that the NFS FH in the I/O request cannot be identified;
receive a file identifier that corresponds to the unidentifiable NFS FH from the centralized controller in response to the parsing request, wherein the file identifier is determined according to a pre-stored correspondence between the NFS FH and the file identifier; and
process the I/O request according to the file identifier.

8. The computer device according to claim 7, wherein the I/O request is received from a virtual machine, wherein the virtual machine runs in the second host before the virtual machine migrates from the second host to the first host, and wherein; after the virtual machine migrates from the second host to the first host, the virtual machine initiates the I/O request to the first NFS server running in the first host without disconnecting the NFS connection established between the virtual machine and the second server running in the second host.

9. The computer device according to claim 7, wherein the processor is further configured to read the instructions stored in the memory to:
determine a newly allocated NFS FH corresponding to the file identifier in the first NFS server;
determine a file system handle (FSH) for processing the I/O request according to the newly allocated NFS FH; and
process the I/O request according to the FSH.

10. The computer device according to claim 9, wherein the processor is further configured to read the instructions stored in the memory to: store a correspondence among the file identifier, the unidentifiable NFS FH, the newly allocated NFS FH, and the FSH locally or at a back end.

11. The computer device according to claim 10, wherein the processor is further configured to read the instructions stored in the memory to: send the correspondence among the file identifier, the unidentifiable NFS FH, the newly allocated NFS FH, and the FSH to the centralized controller.

12. The computer device according to claim 7, wherein the processor is further configured to read the instructions stored in the memory to:
receive the I/O request from the virtual machine before sending the parsing request for the unidentifiable NFS FH to the centralized controller; and
determine that the NFS FH in the I/O request cannot be identified when the NFS FH in the I/O request does not exist in a local cache.

13. A network file system (NFS) having a first host and a second host, the NFS comprising:
a first NFS server running in the first host and configured to:
receive an input/output (I/O) request after a virtual machine migrates from the second host to the first host, wherein the I/O request is initiated by the virtual machine using a NFS file handle (FH) allocated by a second NFS server running in the second host, and wherein after the virtual machine migrates from the second host to the first host, the virtual machine initiates the I/O request while maintaining an NFS connection established with the second NFS server running in the second host and without establishing a new NFS connection with the first NFS server running in the first host;
determine whether the NFS FH is an unidentifiable NFS FH; and
send a parsing request for the unidentifiable NFS FH to a centralized controller responsive to determining that the NFS FH in the I/O request cannot be identified; and
a centralized controller configured to:
receive the parsing request;
search a pre-stored correspondence between NFS FHs and file identifiers for a file identifier corresponding to the unidentifiable NFS FH; and
send the file identifier to the first NFS server,
wherein the first NFS server is further configured to:
receive the file identifier that corresponds to the unidentifiable NFS FH from the centralized controller in response to the parsing request; and
process the I/O request according to the file identifier.

14. The NFS according to claim 13, wherein the I/O request is sent by the virtual machine, wherein the virtual machine runs in the second host before the virtual machine migrates from the second host to the first host, and wherein the second NFS server is further configured to allocate the unidentifiable NFS FH for the virtual machine before the virtual machine migrates from the second host to the first host.

* * * * *

UNITED STATES PATENT AND TRADEMARK OFFICE
CERTIFICATE OF CORRECTION

PATENT NO. : 10,338,849 B2  Page 1 of 1
APPLICATION NO. : 15/667858
DATED : July 2, 2019
INVENTOR(S) : Lin Chen, Xiangyang Xu and Liufei Wen It is certified that error appears in the above-identified patent and that said Letters Patent is hereby corrected as shown below:

On the Title Page

Page (2), Item (56), References Cited, U.S. PATENT DOCUMENTS, Line 23 should read: "Saraf et al."

In the Claims

Claim 2, Column 18, Line 46 should read: "wherein; after the virtual machine migrates from the second"

Claim 8, Column 19, Line 56 should read: "wherein after the virtual machine migrates from the second"

Signed and Sealed this
Twenty-seventh Day of August, 2019

Andrei Iancu
*Director of the United States Patent and Trademark Office*